(12) United States Patent
Sugita

(10) Patent No.: US 9,197,778 B2
(45) Date of Patent: Nov. 24, 2015

(54) METHOD FOR REDUCING COMMUNICATION DELAY IN PRINTING APPARATUS HAVING A WIRELESS LAN CAPABILITY

(71) Applicant: CANON KABUSHIKI KAISHA, Tokyo (JP)

(72) Inventor: Hikaru Sugita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/091,043

(22) Filed: Nov. 26, 2013

(65) Prior Publication Data

US 2014/0146335 A1    May 29, 2014

(30) Foreign Application Priority Data

Nov. 29, 2012 (JP) ................. 2012-260533

(51) Int. Cl.
*H04W 52/02* (2009.01)
*H04N 1/00* (2006.01)

(52) U.S. Cl.
CPC ....... *H04N 1/00896* (2013.01); *H04N 1/00891* (2013.01); *Y02B 60/50* (2013.01)

(58) Field of Classification Search
None
See application file for complete search history.

(56) References Cited

U.S. PATENT DOCUMENTS

2011/0116398 A1* 5/2011 Nakahara ............... 370/252

FOREIGN PATENT DOCUMENTS

JP    2002-300175 A    10/2002

* cited by examiner

*Primary Examiner* — Paul F Payer
(74) *Attorney, Agent, or Firm* — Canon U.S.A., Inc., IP Division

(57) ABSTRACT

When a printing apparatus including a wireless communication unit receives a print job, a power saving mode of the wireless communication unit becomes temporarily disabled. When reception of the print job is completed, the power saving mode returns to an enabled state.

7 Claims, 10 Drawing Sheets

US 9,197,778 B2

METHOD FOR REDUCING COMMUNICATION DELAY IN PRINTING APPARATUS HAVING A WIRELESS LAN CAPABILITY

BACKGROUND OF THE INVENTION

1. Field of the Invention

The present invention relates to a printing apparatus capable of executing wireless communication, a control method for the printing apparatus, and a storage medium.

2. Description of the Related Art

Recently, there are a number of devices having wireless local area network (LAN) capabilities conforming to the institute of electrical and electronics engineers (IEEE) 802.11 standard. Moreover, Japanese Patent Application Laid-Open No. 2002-300175 discusses a power saving mode for wireless LAN. This power saving mode is known as a technique for reducing power consumption of a wireless communication unit for executing wireless communication. Such a power saving mode is described with reference to FIGS. 1 and 2.

FIG. 1 illustrates processing executed when the power saving mode is disabled. In FIG. 1, a printing apparatus is described as a device having a wireless LAN capability. When the power saving mode in the printing apparatus is disabled, a wireless communication unit of the printing apparatus is always in an awake state, that is, the power is supplied to the wireless communication unit. When the wireless communication unit is in the awake state, the printing apparatus can transmit data to an external device or receive data transmitted from the external device via wireless communication.

At timing 101 illustrated in FIG. 1, an access point receives data 1 addressed to the printing apparatus from the external device such as a personal computer (PC). At timing 102, the access point transmits the data 1 to the printing apparatus. Although the access point transmits a signal called a beacon at a certain interval to a peripheral device, the transmission of the data 1 at timing 102 illustrated in FIG. 1 is executed regardless of the beacon interval.

FIG. 2 illustrates processing executed when the power saving mode is enabled. The wireless communication unit repeatedly transitions between the awake state and a doze state when the power saving mode is enabled. In the doze state, the power supply to the wireless communication unit is stopped or reduced. Accordingly, when the wireless communication unit is in the doze state, the printing apparatus cannot transmit data to the external device or receive data transmitted from the external device via wireless communication.

When the power saving mode is enabled, the wireless communication unit intermittently transitions from the doze state to the awake state at timing 201 through timing 203 in synchronization with the beacon interval of the access point. At timing 204, the access point receives data 1 (data addressed to the printing apparatus) transmitted from the PC. At timing 205, the access point notifies the printing apparatus of the presence of the data addressed to the printing apparatus by using information called a traffic indication message (TIM) or a delivery traffic indication message (DTIM). The TIM is information used to notify the printing apparatus of the presence of the data addressed to the printing apparatus. The DTIM is a type of the TIM, and indicates that the data to be transmitted is multicast or broadcast data.

At timing 206 illustrated in FIG. 2, the printing apparatus transitions to the awake state, and receives the TIM notified at timing 205. At timing 207, the printing apparatus requests the access point to transmit the data. At timing 208, the access point transmits the data 1 to the printing apparatus in response to the request.

When the power saving mode is enabled, the wireless communication unit transitions from the awake state to the doze state on condition that data is not transmitted or received between the printing apparatus and the access point for a predetermined time period (e.g., half the time of the beacon interval) in the awake state. At timing 210 illustrated in FIG. 2, when a predetermined time period 209 has elapsed since reception of the data 1 is completed, the wireless communication unit transitions from the awake state to the doze state. After transitioning to the doze state, the wireless communication unit intermittently transitions from the doze state to the awake state in synchronization with the beacon interval of the access point as similar to the transition at timing 201 through timing 203. The condition causing the wireless communication unit to transition from the awake state to the doze state is not limited to the lapse of the predetermined time period 209. The wireless communication unit may transition from the awake state to the doze state on condition that the data addressed to the printing apparatus is not accumulated on the access point. In such a case, the absence of the accumulated data on the access point is confirmed by using the beacon.

Therefore, when the power saving mode is enabled, the wireless communication unit of the printing apparatus repeatedly transitions between the awake state and the doze state. That is, the wireless communication unit does not always remain in the awake state. Accordingly, in a case where the power saving mode is enabled, power consumption of the wireless communication unit of the printing apparatus can be reduced compared to a case where the power saving mode is disabled.

Although the power consumption of the wireless communication unit can be reduced, a communication delay tends to occur in a case where the power saving mode for wireless LAN enabled. The communication delay occurs at the time when the printing apparatus receives the data transmitted from the access point. A reason for the communication delay is described with reference to FIG. 3.

For example, the PC transmits data having a large volume (large-size data) to the printing apparatus through the access point. In such a case, the large volume data is divided into smaller volume data, and each of the divided data is transmitted to the printing apparatus. FIG. 3 illustrates an example case where the large volume data is divided into data 1, data 2, and data 3, and each of the divided data 1, 2, and 3 is transmitted to the printing apparatus. At timing 301, the access point receives data 1 transmitted from the PC. If the power saving mode were disabled, the access point could immediately transmit the data 1 to the printing apparatus. However, since the power saving mode is enabled, the access point needs to wait until timing of a next beacon and transmits the data 1. That is, the communication delay of a time period 302 occurs compared to a case where the power saving mode is disabled.

After receiving the data 1, the wireless communication unit of the printing apparatus transitions from the awake state to the doze state at timing 303 if any data is not transmitted or received for a predetermined time period. When the access point receives data 2 from the PC at timing after the timing 303 as illustrated in FIG. 3, the access point waits until timing of a next beacon and transmits the data 2 to the printing apparatus. That is, even when the data 2 is transmitted to the printing apparatus, the communication delay of a time period 304 occurs. Similarly, when data 3 is transmitted to the printing apparatus, the communication delay of a time period 305 occurs.

In the example illustrated in FIG. 3, the large volume data is divided into three pieces of data and transmitted. Alternatively, data such as a print job having a larger volume may be transmitted. In such a case, the data is divided into a larger number of pieces. This causes the communication delay to be more significant. Since the communication delay causes completion of print processing based on the print job to be delayed, user convenience becomes lowered. Moreover, in some printing apparatuses, if data reception is not completed in a predetermined time period, the data reception is finished as an error. Therefore, when the power saving mode becomes enabled, not only the communication delay tends to occur, but also data communication may fail.

SUMMARY OF THE INVENTION

The present invention is directed to prevention of a communication delay which tends to occur if a power saving mode is enabled.

According to an aspect of the present invention, a printing apparatus includes a wireless communication unit configured to receive a print job including a plurality of divided data, a switching unit configured to switch a state of the wireless communication unit, in a case where the wireless communication unit receives the print job, from a state in which the wireless communication unit repeatedly transitions between an awake state and a doze state to a state in which the wireless communication unit remains in the awake state, and a printing unit configured to execute print processing based on the print job received by the wireless communication unit, wherein the wireless communication unit remains in the awake state until reception of the print job including the plurality of divided data is completed.

Further features and aspects of the present invention will become apparent from the following detailed description of exemplary embodiments with reference to the attached drawings.

DESCRIPTION OF THE EMBODIMENTS

Various exemplary embodiments, features, and aspects of the invention will be described in detail below with reference to the drawings.

The following exemplary embodiments are not intended to limit the scope of the claims of the present invention, and all the combinations of the features described in the exemplary embodiments are not always needed for a problem to be solved by the present invention.

Figure 4:
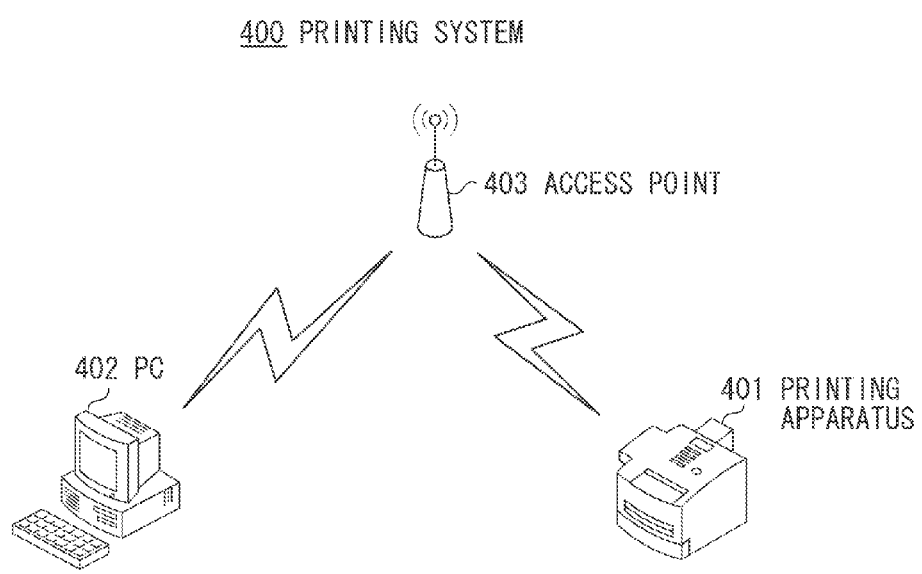
FIG. 4 is a diagram illustrating a printing system according to a first exemplary embodiment.

FIG. 4 is a diagram illustrating a configuration of a printing system 400 according to a first exemplary embodiment. The printing system 400 includes a printing apparatus 401, a PC 402, and an access point 403. The printing apparatus 401 and the PC 402 are wirelessly communicable with each other through the access point 403.

Figure 5:
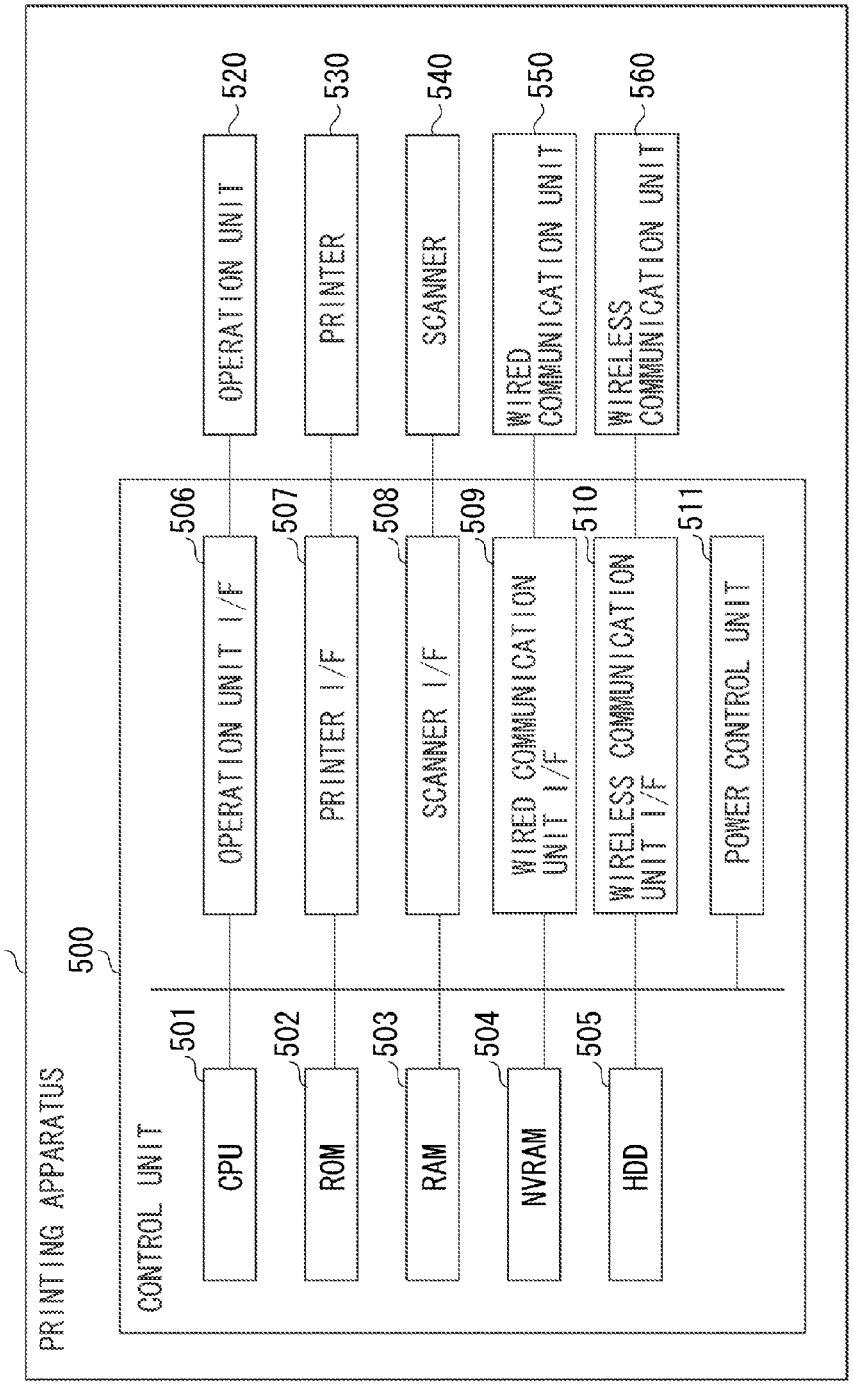
FIG. 5 is a diagram illustrating a hardware configuration of the printing apparatus.

FIG. 5 is a diagram illustrating a hardware configuration of the printing apparatus 401. The printing apparatus 401 is a multifunction peripheral having a copy function, a print function, a scanning function, and a transmission function. In the present exemplary embodiment, the multifunction peripheral is described as an example. However, the printing apparatus 401 is not limited to the multifunction peripheral. The printing apparatus 401 does not necessarily have all the above functions. The printing apparatus 401 may be a printer having the print function only. Alternatively, the printing apparatus 401 may have other functions.

The printing apparatus 401 includes a control unit 500, an operation unit 520, a printer 530, a scanner 540, a wired communication unit 550, and a wireless communication unit 560.

The control unit 500 includes a central processing unit (CPU) 501. The CPU 501 reads a control program stored in a read only memory (ROM) 502, and controls the entire operations of the printing apparatus 401. A random access memory (RAM) 503 is used as a main memory and a temporary storage area such as a work area of the CPU 501. A nonvolatile random access memory (NVRAM) 504 is a nonvolatile memory, and stores various information. A hard disk drive (HDD) 505 is used as a storage area for storing font data, emulation programs, and form data.

The printing apparatus 401 causes one CPU 501 to execute each step of the flowchart described below by using one memory (the RAM 503 or the HDD 505). However, the printing apparatus 401 may have a different configuration. For example, a plurality of CPUs and a plurality of RAMs or HDDs may cooperate with each other to execute each step of the flowchart described below.

An operation unit interface (I/F) 506 connects the operation unit 520 and the control unit 500. The control unit 500 and the operation unit 520 transfer data therebetween through the operation unit I/F 506. The operation unit 520 includes a keyboard or a liquid crystal display unit having a touch panel function. A user can input an instruction to the printing apparatus 401 through the operation unit 520.

A printer I/F 507 connects the printer 530 and the control unit 500. The control unit 500 and the printer 530 transfer data therebetween through the printer I/F 507. The printer 530 executes print processing based on a print job received from the PC 402 or image data generated by the scanner 540.

A scanner I/F 508 connects the scanner 540 and the control unit 500. The control unit 500 and the scanner 540 transfer data therebetween through the scanner I/F 508. The scanner 540 generates image data by reading a document.

A wired communication I/F 509 connects the wired communication unit 550 and the control unit 500. The control unit 500 and the wired communication unit 550 transfer data therebetween through the wired communication I/F 509. The wired communication unit 550 is connected to a LAN cable (not illustrated), so that the wired communication unit 550 can communicate with an external device on a network.

A wireless communication unit I/F 510 connects the wireless communication unit 560 and the control unit 500. The control unit 500 and the wireless communication unit 560 transfer data therebetween through the wireless communication unit I/F 510. The wireless communication unit 560 can wirelessly communicate with an external device on a network through the access point 403.

A power control unit 511 controls the power supply from a power source (not illustrated) to each of the control unit 500, the operation unit 520, the printer 530, the scanner 540, the wired communication unit 550, and the wireless communication unit 560 of the printing apparatus 401.

In the present exemplary embodiment, the wireless communication unit 560 of the printing apparatus 401 has a power saving mode. If the power saving mode is disabled, the wireless communication unit 560 is always in an awake state, that is, the power is supplied to the wireless communication unit 560 by the power control unit 511. When the wireless communication unit 560 is in the awake state, the printing apparatus 401 can transmit data to the external device or receive data transmitted from the external device by using wireless communication.

On the other hand, if the power saving mode is enabled, the wireless communication unit 560 repeatedly transitions between the awake state and a doze state. In the doze state, the power supply to the wireless communication unit 560 is stopped or reduced by the power control unit 511. When the wireless communication unit 560 is in the doze state, the printing apparatus 401 cannot transmit data to the external device or receive data transmitted from the external device by using wireless communication.

When the power saving mode is enabled, the wireless communication unit 560 of the printing apparatus 401 transitions from the doze state to the awake state in synchronization with a beacon interval of the access point 403. Accordingly, in a case where the power saving mode is enabled, power consumption of the wireless communication unit 560 of the printing apparatus 401 can be reduced compared to a case where the power saving mode is disabled.

Figure 6:
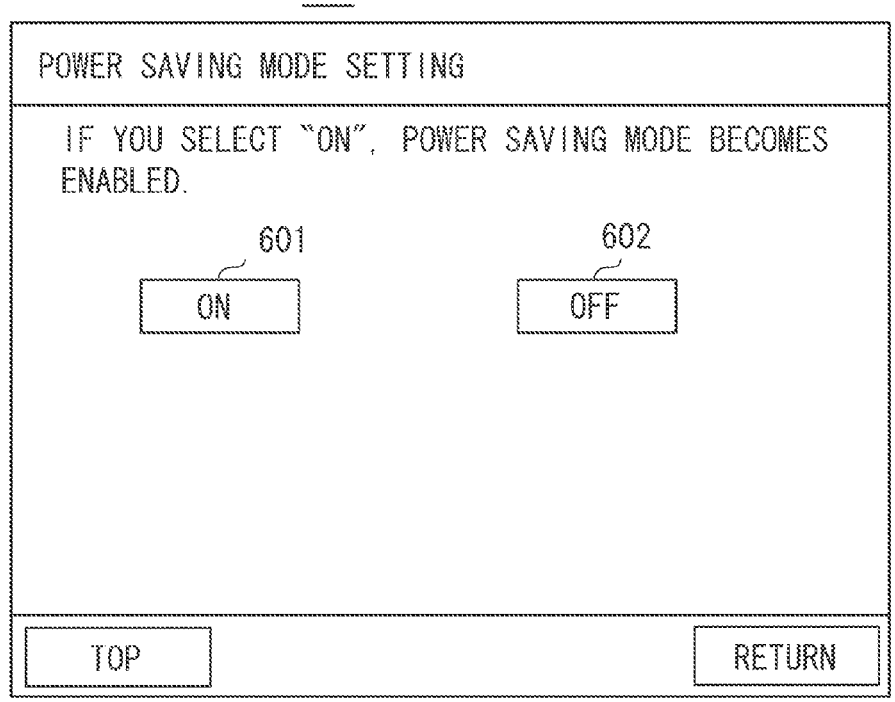
FIG. 6 is a diagram illustrating a setting screen used when a power saving mode is to be set.

In the present exemplary embodiment, a user can designate whether the power saving mode should be enabled or disabled. FIG. 6 is a setting screen 600 displayed on the operation unit 520. On the setting screen 600, if the user selects an ON button 601, the power saving mode becomes enabled. On the other hand, if the user selects an OFF button 602 on the setting screen 600, the power saving mode becomes disabled.

Figure 7:
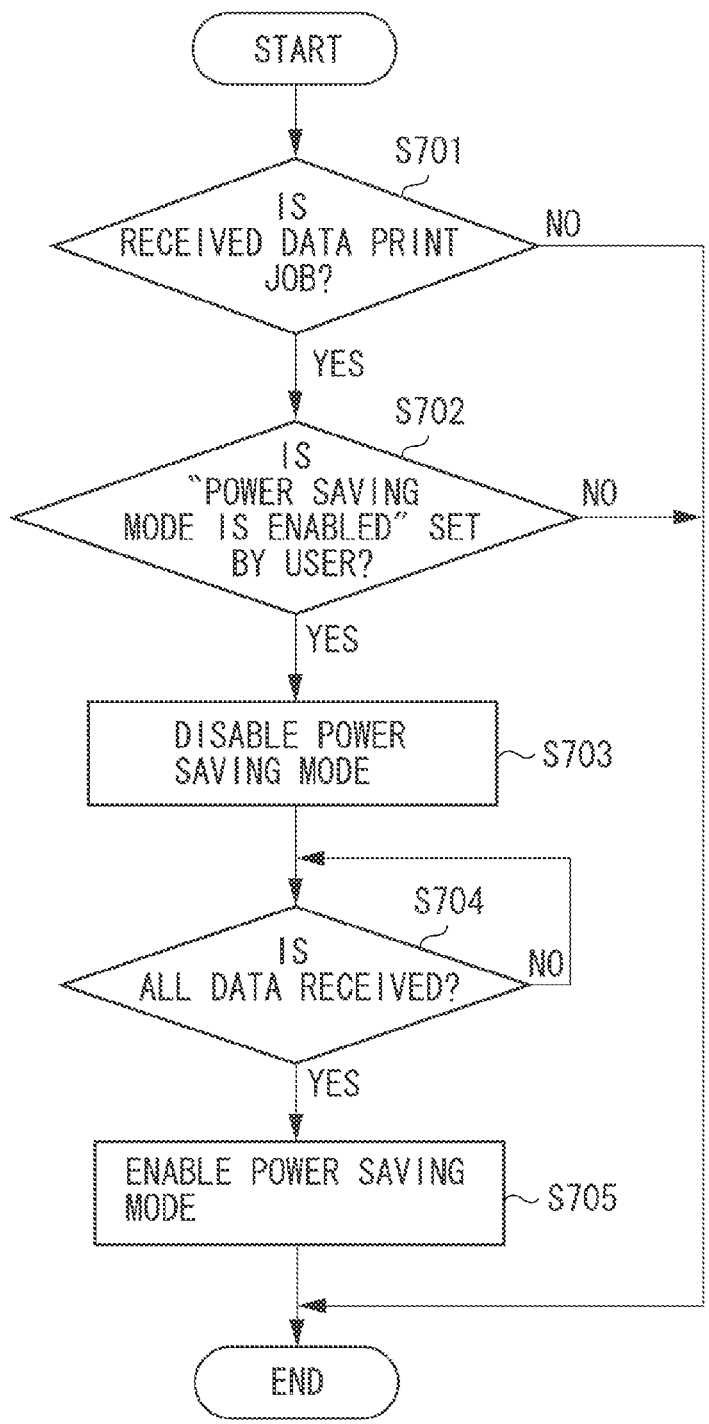
FIG. 7 is a flowchart illustrating processing executed when a wireless communication unit receives data in the first exemplary embodiment.

FIG. 7 is a flowchart illustrating processing executed when the wireless communication unit 560 of the printing apparatus 401 receives data transmitted from the external device. Each step in the flowchart illustrated in FIG. 7 is executed by the CPU 501. The CPU 501 loads a program stored in a memory such as the ROM 502 to the RAM 503, and executes the loaded program for each step. In the printing apparatus 401, assume that the user uses the setting screen 600 illustrated in FIG. 6 to set beforehand whether the power saving mode should be enabled or disabled. This setting is stored in the NVRAM 504 of the printing apparatus 401.

In the present exemplary embodiment, the data transmitted from the PC 402 is received by the wireless communication unit 560 of the printing apparatus 401 through the access point 403. In step S701, when the wireless communication unit 560 receives the data transmitted from the PC 402, the CPU 501 determines whether the received data is a print job. Herein, the CPU 501 makes a determination based on analysis of a port number used for the communication and a header of the received data.

If the CPU 501 determines that the received data is not a print job (NO in step S701), the processing of the flowchart ends. The case in which the received data is not a print job includes, for example, a case where the PC 402 gives an instruction to store image data into the HDD 505, and the wireless communication unit 560 receives the image data to be stored.

If the CPU 501 determines that the received data is a print job (YES in step S701), the operation proceeds to step S702. In step S702, the CPU 501 determines whether "the power saving mode is enabled" is set by the user. If the user has selected the ON button 601 on the setting screen 600, and the resultant selection has been stored in the NVRAM 504, the CPU 501 determines that "the power saving mode is enabled" is set by the user (YES in step S702). Subsequently, the operation proceeds to step S703. On the other hand, if the user has selected the OFF button 602 on the setting screen 600, and the resultant selection has been stored in the NVRAM 504, the CPU 501 determines that "the power saving mode is enabled" is not set by the user (NO in step S702). Then, the processing of the flowchart ends.

If the CPU 501 determines that "the power saving mode is enabled" is set by the user (YES in step S702), then in step S703, the CPU 501 causes the power saving mode to be disabled. The wireless communication unit 560 notifies the access point 403 of the fact that the power saving mode becomes disabled. The processing executed in step S703 is described in detail with reference to FIG. 8.

Figure 8:
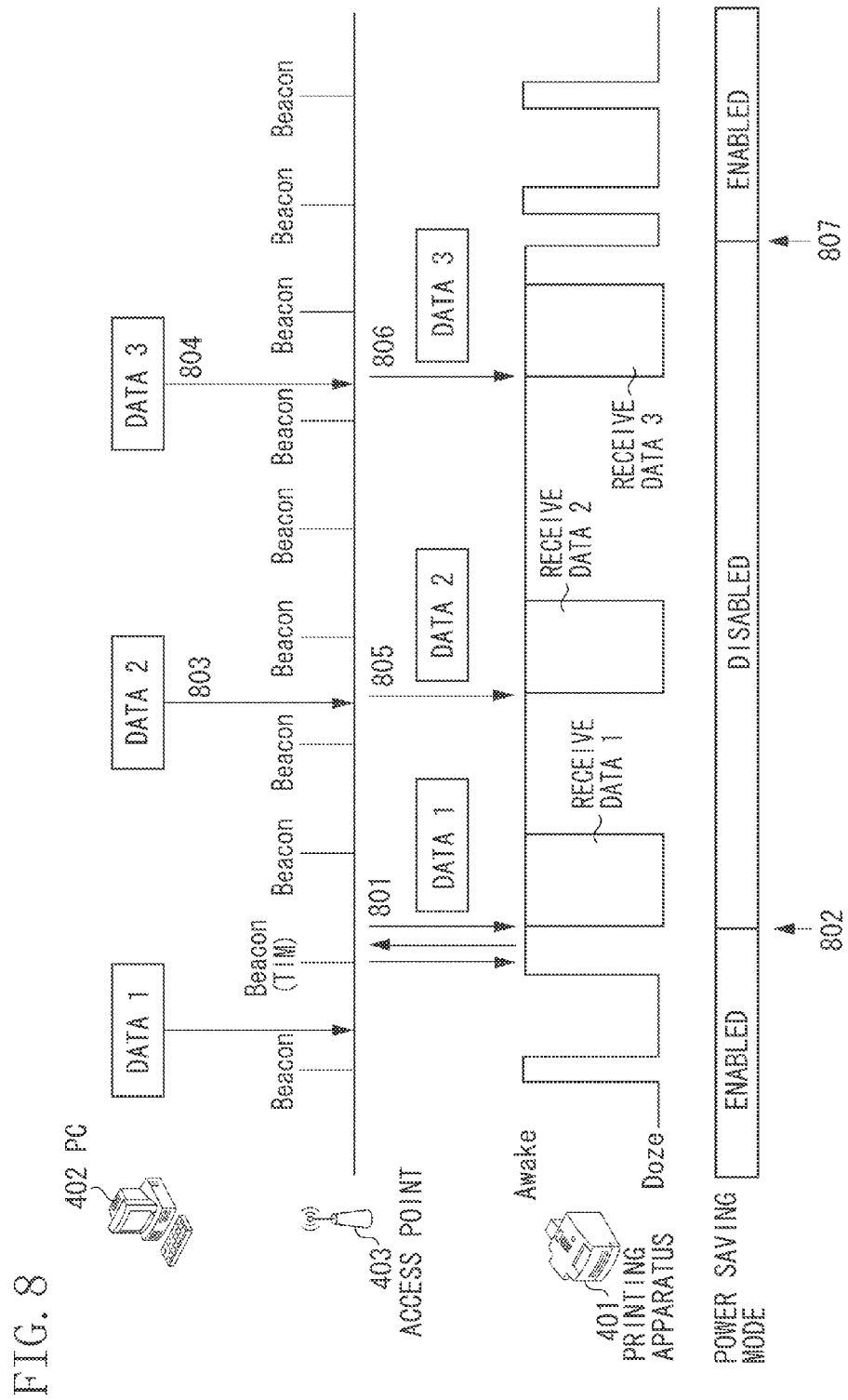
FIG. 8 is a diagram illustrating processing performed when the power saving mode is switched between being enabled and disabled in the first exemplary embodiment.

FIG. 8 is a diagram illustrating processing executed when the power saving mode of the wireless communication unit 560 is enabled, that is, the ON button 601 on the setting screen 600 has been selected by the user. The PC 402 transmits data 1, data 2, and data 3 to the printing apparatus 401. The data 1, 2, and 3 are provided by dividing the print job into three pieces of data.

The power saving mode is enabled at the beginning of the processing illustrated in FIG. 8. At timing 801, the access point 403 transmits the data 1 to the printing apparatus 401, and the CPU 501 of the printing apparatus 401 determines that the received data is the print job. At timing 802, the CPU 501 causes the power saving mode to be disabled (step S703 illustrated in FIG. 7). In the present exemplary embodiment, the power saving mode remains disabled until all the divided data 1, 2, and 3 is received.

At timing 803, the access point 403 receives the data 2 subsequent to the data 1 from the PC 402. At timing 804, the access point 403 receives the data 3 from the PC 402. The power saving mode remains disabled at both timing 803 and timing 804. At timing 805 and timing 806, the access point 403 can immediately start transmitting the data 2 and 3 to the printing apparatus without waiting for a next beacon. That is, if the power saving mode having been set as enabled becomes disabled, a communication delay such as time periods 304 and 305 illustrated in FIG. 3 can be prevented.

Now, the description returns to the flowchart illustrated in FIG. 7. In step S704, the CPU 501 determines whether data reception is completed. In the present exemplary embodiment, if all the divided data is received (e.g., the data 1, 2, and 3 illustrated in FIG. 8) (YES in step S704), the CPU 501 determines that the data reception is completed. Then, the operation proceeds to step S705. On the other hand, if the data reception is not completed (NO in step S704), the CPU 501 waits until all the data is received.

In step S705, the CPU 501 causes the power saving mode to be enabled. The wireless communication unit 560 notifies the access point 403 of the fact that the power saving mode becomes enabled. Such processing is executed at timing 807 illustrated in FIG. 8.

According to the present exemplary embodiment, therefore, even if the power saving mode is set as enabled by the user, the CPU 501 causes the power saving mode to be temporarily disabled in a case where the printing apparatus 401 receives the print job. The CPU 501 causes the power saving mode to remain disabled until reception of the print job is completed. This can prevent a communication delay which tends to occur in a case where the power saving mode is enabled. Moreover, when reception of the print job is completed, the CPU 501 causes the power saving mode to return to the enabled state. This reduces power consumption of the wireless communication unit 560.

In the first exemplary embodiment, even if the power saving mode is set as enabled by the user, the CPU causes the power saving mode to be temporarily disabled in a case where the printing apparatus receives the print job. In other words, in a case where the power saving mode is set as enabled by the user, and the received data is not a print job, the power saving mode remains enabled in the first exemplary embodiment. In a second exemplary embodiment, even if received data is not a print job, a power saving mode is temporarily disabled on condition that the received data is a specific type of data.

Figure 9:
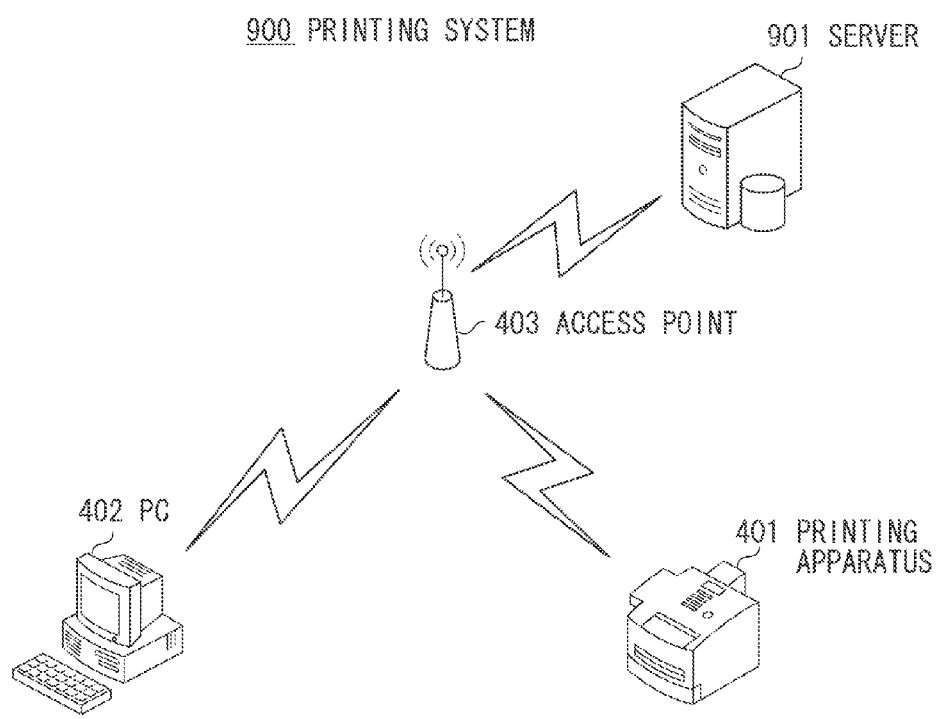
FIG. 9 is a diagram illustrating a printing system according to a second exemplary embodiment.

FIG. 9 is a diagram illustrating a printing system 900 according to the present exemplary embodiment. The printing system 900 includes the printing apparatus 401, the PC 402, the access point 403, and a server 901. The server 901 can communicate with the printing apparatus 401 through the access point 403. The server 901 accumulates moving image data (e.g., moving image data indicating a maintenance procedure of the printing apparatus 401) to be viewed in the printing apparatus 401 by a user. The server 901 transmits the moving image data to the printing apparatus 401 according to a request from the printing apparatus 401.

Figure 10:
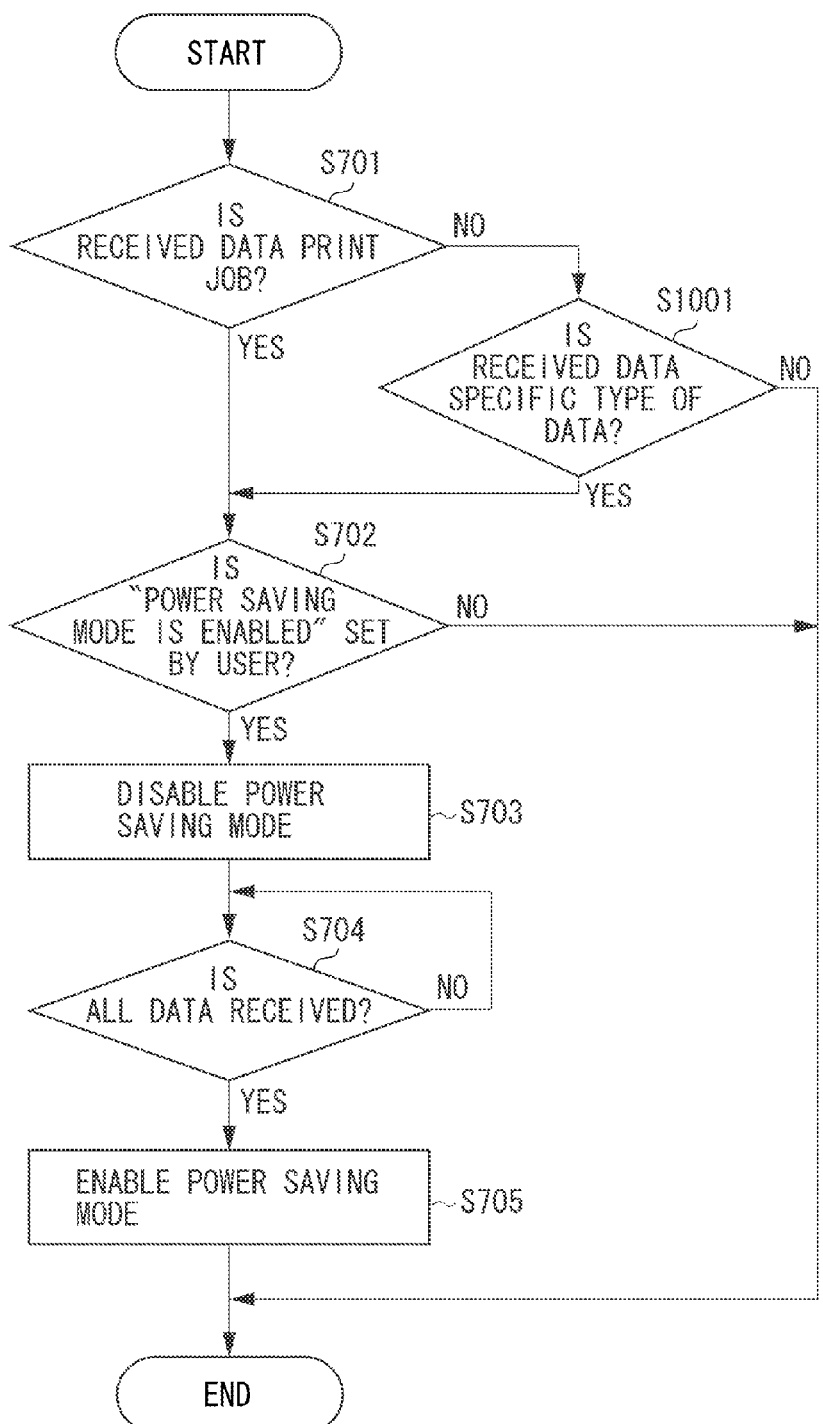
FIG. 10 is a flowchart illustrating processing executed when the wireless communication unit receives data in the second exemplary embodiment.

FIG. 10 is a flowchart illustrating processing executed when the wireless communication unit 560 of the printing apparatus 401 receives data transmitted from an external device. Each step in the flowchart illustrated in FIG. 10 is executed by the CPU 501. The CPU 501 loads a program stored in a memory such as the ROM 502 to the RAM 503, and executes the loaded program for each step. Since steps S701 through S705 of the flowchart illustrated in FIG. 10 are substantially the same as those illustrated in FIG. 7, descriptions thereof are omitted.

If the CPU 501 determines that the received data is not a print job (NO in step S701), the operation proceeds to step S1001. In step S1001, the CPU 501 determines whether the received data is a specific type of data. In the present exemplary embodiment, if the wireless communication unit 560 of the printing apparatus 401 receives the moving image data, the CPU 501 determines that the specific type of data is received. Herein, the CPU 501 makes a determination based on analysis of a port number used for communication and a header of the received data.

If the received data is the moving image data (YES in step S1001), then in step S702, the CPU 501 determines whether the power saving mode is enabled. If the power saving mode is enabled (YES in step S702), then in step S703, the CPU 501 causes the power saving mode to be disabled as similar to the case of the print job reception.

Figure 1:
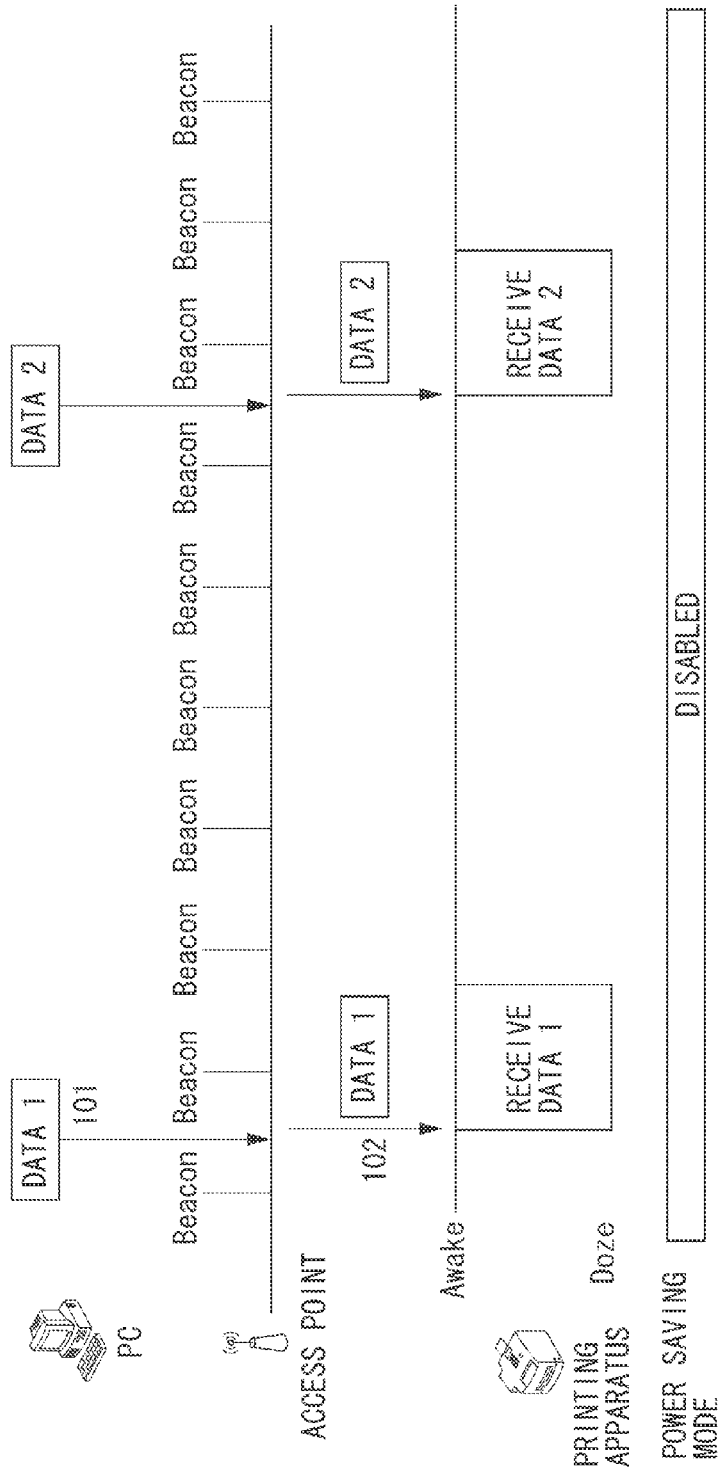
FIG. 1 is a diagram illustrating processing executed when a power saving mode is disabled according to a conventional technique.
Figure 2:
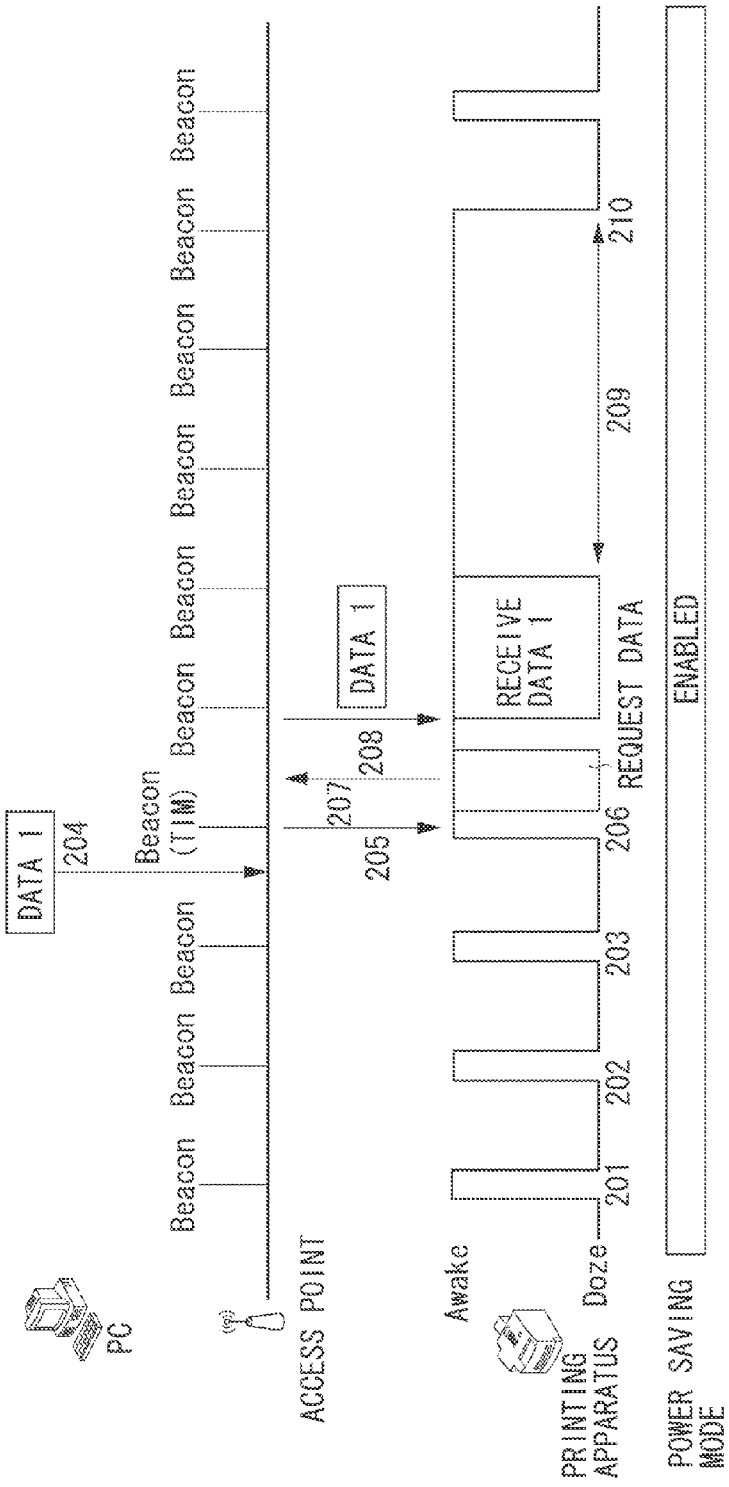
FIG. 2 is a diagram illustrating processing executed when the power saving mode is enabled according to the conventional technique.
Figure 3:
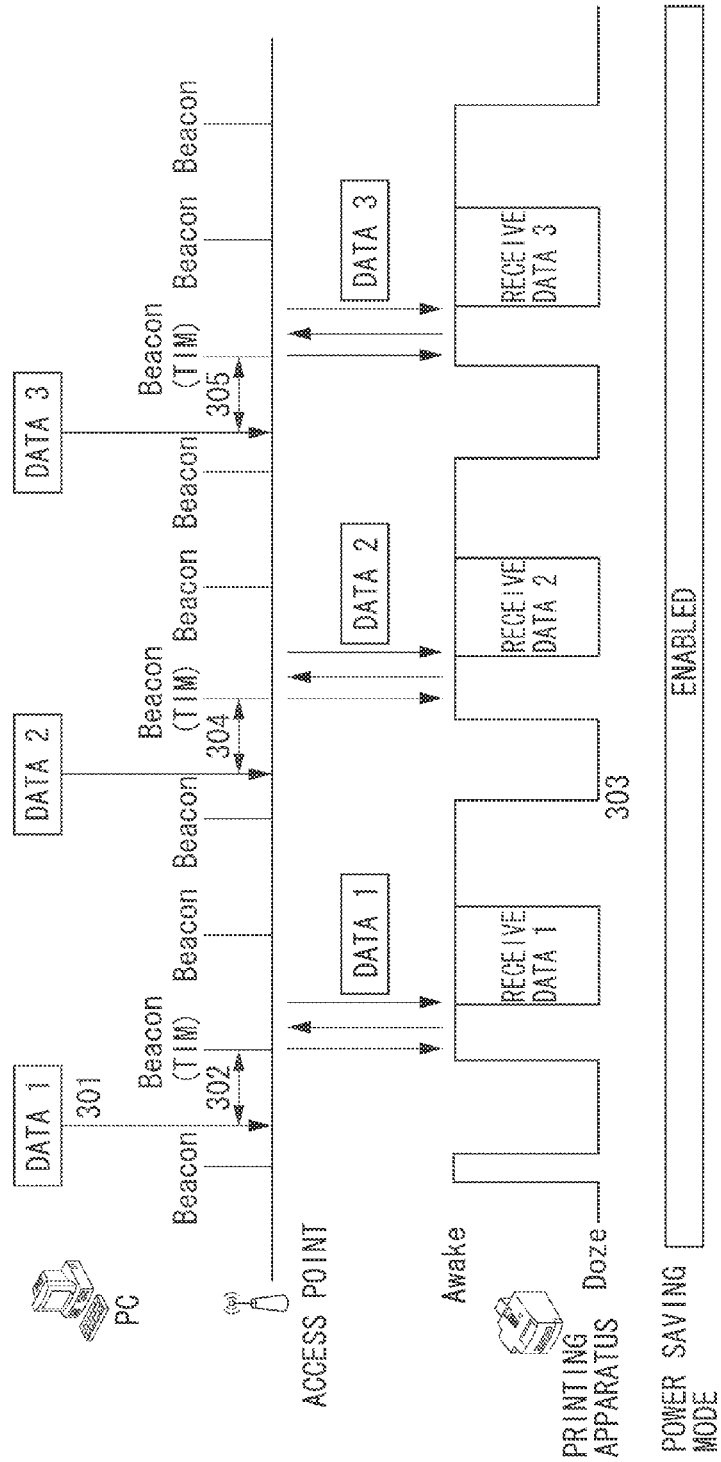
FIG. 3 is a diagram illustrating the occurrence of a communication delay.

Since a volume of the moving image data is more likely to be large, a communication delay of the data tends to occur as similar to the print job described in FIG. 3. In the present exemplary embodiment, even if the power saving mode is set as enabled by the user, the CPU 501 causes the power saving mode to be temporarily disabled in a case where the wireless communication unit 560 of the printing apparatus 401 receives the moving image. This can prevent the communication delay which tends to occur in a case where the power saving mode is enabled.

In step S1001 illustrated in FIG. 10, the CPU 501 determines that the received data is the specific type of data on condition that the wireless communication unit 560 receives the moving image data. Alternatively, other conditions may be applied. For example, in a case where received data is audio data, the CPU 501 may determine that the data received in step S1001 is a specific type of data.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications, equivalent structures, and functions.

This application claims the benefit of Japanese Patent Application No. 2012-260533 filed Nov. 29, 2012, which is hereby incorporated by reference herein in its entirety.

What is claimed is:

1. A printing apparatus comprising:
   a printing unit configured to execute print processing based on a print job;
   a wireless communication unit capable of operating in a power saving mode in which the wireless communication unit repeatedly transitions between an Awake state and a Doze state;
   a setting unit configured to set, as a setting for the power saving mode, either an ON setting indicating that the power saving mode is to be used or an OFF setting indicating that the power saving mode is not to be used, based on a designation by a user; and
   a controlling unit configured to cause, in a case where the ON setting is set by the setting unit, the power saving mode to be temporarily disabled in response to the wireless communication unit starting reception of a print job from an external apparatus, wherein, in a case where the ON setting is set by the setting unit, the controlling unit causes the power saving mode to return to an enabled state in response to the wireless communication unit completing the reception of the print job from the external apparatus.

2. The printing apparatus according to claim 1, wherein the print job received by the wireless communication unit from the external apparatus is divided into a plurality of pieces of data, wherein, in a case where the ON setting is set by the setting unit, the controlling unit causes the power saving mode to be temporarily disabled in response to the wireless communication unit starting reception of a first piece of data included in the print job, and wherein, in a case where the ON setting is set by the setting unit, the controlling unit causes the power saving mode to return to the enabled state in response to the wireless communication unit completing reception of a last piece of data included in the print job.

3. The printing apparatus according to claim 1, wherein the wireless communication unit repeatedly transitions between the Awake state and the Doze state in synchronization with a beacon interval of an access point.

4. The printing apparatus according to claim 1, further comprising:

a displaying unit configured to display a setting screen allowing the user to select, as the setting for the power saving mode, either the ON setting or the OFF setting, wherein the setting unit sets, as the setting for the power saving mode, either the ON setting or the OFF setting based on the designation input by the user via the setting screen.

5. The printing apparatus according to claim 1, wherein, in a case where the OFF setting is set by the setting unit, the controlling unit causes the power saving mode to be always disabled.

6. A control method for a printing apparatus including a wireless communication unit, the control method comprising;

setting, as a setting for a power saving mode of a wireless communication unit, either an ON setting indicating that the power saving mode is to be used or an OFF setting indicating that the power saving mode is not to be used, based on a designation by a user;

controlling the wireless communication unit, in a case where the ON setting is set, to cause the power saving mode to be temporarily disabled in response to the wireless communication unit starting reception of a print job from an external apparatus; and controlling, in a case where the ON setting is set, the power saving mode to return to an enabled state in response to the wireless communication unit completing the reception of the print job from the external apparatus.

7. A non-transitory storage medium storing a program causing a computer to execute the control method for a printing apparatus according to claim 6.

* * * * *